United States Patent
Kirch

[15] 3,689,546
[45] Sept. 5, 1972

[54] PREPARATION OF ARYL HALIDES

[72] Inventor: Lawrence S. Kirch, Huntington Valley, Pa. 19006

[73] Assignee: Rohm and Hass Company, Philadelphia, Pa.

[22] Filed: March 5, 1969

[21] Appl. No.: 804,677

[52] U.S. Cl. ........260/544 M, 260/651 R, 260/651 F, 260/646, 260/599, 260/579, 260/567.6 M, 260/515 A, 260/476 R, 260/465 G
[51] Int. Cl. ...................C07c 51/58, C07c 63/10
[58] Field of Search ..................................260/544 R

[56] References Cited

OTHER PUBLICATIONS

Morrison et al., Organic Chemistry, p. 35, (1959). Allyr & Bacon, Inc., Boston, Mass.
Miller et al., J.A.C.S., Vol. 79, p. 4187– 4191, (1957).

*Primary Examiner*—Lorraine A. Weinberger
*Assistant Examiner*—Richard D. Kelly
*Attorney*—Carl A. Castellan and George W. F. Simmons

[57] ABSTRACT

The invention relates to a process for the preparation of an aryl dihalide by heating an aryldisulfonyl halide in the presence of an elemental halogen.

3 Claims, No Drawings

PREPARATION OF ARYL HALIDES

This invention relates to a novel process for the preparation of aryl dihalides.

According to the invention, an aryl dihalide can be prepared by heating in the presence of the corresponding elemental halogen an arylsulfonyl halide having the formula

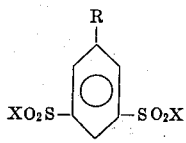

wherein R is a meta-directing, deactivating substituent and

X is chlorine or bromine.

By a meta-directing, deactivating substituent is meant any substituent which will deactivate a benzene ring towards electrophilic substitution, so that electrophilic substitution will take place preferentially at positions meta to the substituent. Among the substituents which R can represent are nitro, cyano, formyl, carboxy, trichloromethyl, trifluoromethyl, quaternary ammonium, including trialkyl ammonium, and carbalkoxy, such as carbomethoxy, carbethoxy, carbobutoxy, and carbohexyloxy. The reaction proceeds smoothly, with evolution of sulfur dioxide, to give a high yield of the aryl halide. The reaction is substantially completed when sulfur dioxide ceases to evolve from the reaction mixture.

The process of the invention may be carried out over a broad temperature range, and the temperature at which the reaction is run will depend in part on the arylsulfonyl halide which is used as starting material. Furthermore, the temperature may be varied over the course of the reaction. In general, the reaction will be run within the temperature range of about 160° to 270° C.

A wide variety of arylsulfonyl halides can be reacted according to the process of the invention. Examples of arylsulfonyl halides which can be reacted according to the process of the invention include 3,5-dichlorosulfonylbenzoyl chloride, 3,5-dibromosulfonylbenzoyl bromide, 3,5-dichlorosulfonylbenzoic acid, ethyl 3,5-dichlorosulfonylbenzoate, 3,5-dichlorosulfonylbenzonitrile, 3,5-dichlorosulfonylaniline hydrochloride, 3,5-dichlorosulfonyl-N,N,N-trimethylanilinium chloride, 3,5-dichlorosulfonylbenzaldehyde, 3,5-dichlorosulfonylnitrobenzene, and 3,5-dichlorosulfonylbenzotrichloride.

An aryl halide which is produced by the process of the invention can be separated from the reaction mixture by any convenient means. Generally, the aryl halide is advantageously removed from the reaction mixture by distillation at reduced pressure.

In general, no solvent need be used in carrying out the process of the reaction. When no solvent is used, the temperature at which the reaction is carried out will be higher than the melting point of the arylsulfonyl halide starting material. However, a solvent which is inert to the reaction process can be employed. Among the solvents which are especially suitable are those aromatic hydrocarbons, ethers, nitriles, and carbalkoxy compounds which are highly halogenated, that is, in which most of the hydrogen atoms of the parent compound have been replaced by halogen atoms. Preferably, the solvent will have a higher boiling point than the aryl halide product so that the product can be conveniently removed by distillation.

An essential feature of the process of the invention is the presence in the reaction system of an elemental halogen, which acts as a catalyst in the reaction. Since the halogen is employed as a catalyst, the quantity which is used can vary over a wide range and any amount which will produce the desired catalysis can be used. Advantageously, the halogen is passed through the system at a steady flow rate, this flow rate being determined by the reaction temperature, the arylsulfonyl halide being reacted, and other factors. Generally, about 0.01 to about 1 mole of the halogen are passed into the system for each mole of arylsulfonyl halide which is reacted. The preferred range is about 0.1 to 0.5 mole of halogen per mole of arylsulfonyl halide.

The reaction time will depend on the reaction temperature, the arylsulfonyl halide which is reacted, and other factors. In general, a reaction time of about 1 to 20 hours will be sufficient to complete the reaction.

The process of the reaction has many advantages in the preparation of aryl halides. It is a very "clean" reaction, giving a high yield of the desired product with little formation of undesired or undesirable side products, and leaving very little residue on distillation. Furthermore, by means of this process, many 3,5-dihalo benzene compounds, the preparation of which formerly necessitated involved procedures, can now be prepared simply. For example, since direct chlorination of benzoyl chloride gives mainly the 3,4- and 2,3-isomers, the preparation of 3,5-dichlorobenzoyl chloride formerly required a complicated six-step procedure with relatively low overall yield. By utilizing the process of the present invention, 3,5-dichlorobenzoyl chloride can be prepared in a four-step, one-pot procedure (i.e., without isolating any of the intermediates), with very high overall yield.

The arylsulfonyl halides which are used as starting materials in the process of the invention can be prepared by any of the methods well known to those skilled in the art. One preparation which can be advantageously employed comprises the steps of sulfonation of the aromatic compound with sulfur trioxide or oleum, followed by conversion of the sulfonic acid thus formed to the sulfonyl halide with a phosphorus oxyhalide, a phosphorus pentahalide or similar reagent.

The following examples will further illustrate this invention but are not intended to limit it in any way.

EXAMPLE 1

Desulfoxylation of 3,5-Dichlorosulfonylbenzoyl Chloride

Eighty-nine g. (0.264 mole) 3,5-dichlorosulfonylbenzoyl chloride is charged to a distilling flask fitted with a gas inlet tube, thermometer and condenser and slowly heated to 210° C. The melt is maintained at 210° C. while a stream of chlorine (0.25 g./min.) is introduced below the surface of the melt. Upon introducing the chlorine, evolution of sulfur dioxide is noted. The $SO_2$ evolution lasts for 2 hours. The chlorine is then terminated and the batch cooled. The resulting crude produce is very pale yellow and weighs 54 g. Straight lead distillation affords 52 g. (94 percent yield) of 3,5-dichlorobenzoyl chloride (b. 60–67/ C./0.3 mm. Hg) which is 100 percent pure by GLC.

EXAMPLE 2

Preparation of 3,5-Dichlorobenzoyl Chloride from Benzoic Acid

One hundred and twenty-two g. (1 mole) of benzoic acid is charged to a flask fitted with a thermometer, stirrer, condenser, gas inlet tube and dropping funnel. The benzoic acid is heated to 125° C. and then 176 g. (2.2 moles) $SO_3$ are added over a period of 2 hours. During the addition, the temperature is gradually increased to 170° C. After all the $SO_3$ has been added, the batch is heated to 220° C. and maintained at this temperature for 16 hours. The batch temperature is gradually reduced to 120° C. while adding 460 g. (3 moles) $POCl_3$. The batch is maintained at 120° C. for an additional hour and then 151 g. (1.1 moles) $PCl_3$ and 85 g. (1.2 moles) $Cl_2$ gas are simultaneously introduced over a period of 1 hour. During this addition and for 1 more hour, the temperature is maintained at 120° C.

The condenser is then replaced with a straight lead distillation head and $POCl_3$ distilled from the mix at atmospheric pressure. Four-hundred g. (87 percent) $POCl_3$, suitable for recycle, is recovered. After the $POCl_3$ has been distilled, the batch is heated to 220° C. and $Cl_2$ gas is introduced below the liquid surface at a rate of 0.25 g./min. $SO_2$ evolution starts at once and continues for about 4 hours. The batch is then cooled to 50° C. and 3,5-dichlorobenzoyl chloride distilled from the crude mix. The product cut weighs 168 g. and contains 91 percent 3,5-dichlorobenzoyl chloride (73 percent yield) and 3 percent m-chlorobenzoyl chloride (3 percent yield based on benzoic acid).

It is to be understood that changes and variations may be made without departing from the spirit and scope of the invention as defined by the appended claims.

I claim:

1. A process for preparing 3,5-dichlorobenzoyl chloride, which comprises heating 3,5-dichlorosulfonylbenzoyl chloride to its melting point, passing chlorine into the molten mass, and maintaining the mass in molten condition until evolution of sulfur dioxide ceases.

2. A process for preparing 3,5-dichlorobenzoyl chloride which comprises heating 3,5-dichlorosulfonylbenzoyl chloride at a temperature of about 160° C. to about 270° C. in the presence of chlorine with the evolution of sulfur dioxide gas.

3. A process according to claim 2 wherein said heating is maintained until the evolution of sulfur dioxide substantially ceases.

* * * * *